US009609626B1

(12) United States Patent
Rastogi et al.

(10) Patent No.: US 9,609,626 B1
(45) Date of Patent: Mar. 28, 2017

(54) CELLULAR PAGING VIA WLAN

(71) Applicant: Amazon Technologies, Inc., Seattle, WA (US)

(72) Inventors: Nupur Rastogi, Cupertino, CA (US); Sanjeev Gupta, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 325 days.

(21) Appl. No.: 14/571,072

(22) Filed: Dec. 15, 2014

(51) Int. Cl.
*H04W 68/12* (2009.01)
*H04W 76/02* (2009.01)
*H04W 52/02* (2009.01)

(52) U.S. Cl.
CPC ....... *H04W 68/12* (2013.01); *H04W 52/0229* (2013.01); *H04W 76/028* (2013.01)

(58) Field of Classification Search
CPC ..... H04W 88/06; H04W 68/12; H04W 84/12; H04W 68/02; H04W 84/042; H04W 52/02; H04W 52/0229; H04W 52/0235; H04W 92/02; H04W 40/02; H04W 68/00; H04W 8/18; Y02B 60/50
See application file for complete search history.

(56) References Cited

U.S. PATENT DOCUMENTS

| 7,937,085 | B2* | 5/2011 | Rydnell | H04W 68/12 455/432.1 |
| 8,504,902 | B2* | 8/2013 | Shi | H04W 68/00 455/115.3 |
| 8,619,757 | B2* | 12/2013 | Shaheen | H04L 12/5835 370/352 |
| 9,332,415 | B2* | 5/2016 | Shaheen | H04L 12/5835 |
| 9,344,995 | B2* | 5/2016 | Lim | H04W 68/12 |
| 2004/0002330 | A1* | 1/2004 | Chitrapu | H04W 48/16 455/426.2 |
| 2004/0218575 | A1* | 11/2004 | Ibe | H04W 36/0011 370/338 |
| 2004/0242230 | A1* | 12/2004 | Rue | H04W 92/02 455/433 |
| 2004/0248574 | A1* | 12/2004 | Watanabe | H04W 68/04 455/435.1 |

(Continued)

FOREIGN PATENT DOCUMENTS

| CN | WO 2011047503 | A1 * | 4/2011 | ......... H04B 7/15542 |
| CN | WO 2014100931 | A1 * | 7/2014 | ............ H04W 68/02 |
| WO | WO 2015200263 | A1 * | 12/2015 | ............ H04W 52/02 |

*Primary Examiner* — Matthew Sams
(74) *Attorney, Agent, or Firm* — Lee & Hayes, PLLC

(57) ABSTRACT

Systems and methods for routing pages to cellular phones (UE) not connected to a cellular network, but connected to a wireless local area network (I-WLAN), are disclosed. The system can route cellular pages to disconnected cellular devices using 3GPP AAA components, such as a Third Generation Partnership Project authentication, authorization, and accounting (3GPP AAA) server. The system can route pages via a home location register (HLR) connected to the I-WLAN or a mobile switching center (MSC) connected to the I-WLAN. The system can determine an appropriate MSC based on proximity of the MSC to the last known location of the UE, for example, or based on the MSC with the lowest utilization rates. The system can send a page to the UE via the I-WLAN instructing the UE to reconnect to the cellular network. The system can then send cellular data to the UE using the cellular network.

20 Claims, 12 Drawing Sheets

(56) References Cited

U.S. PATENT DOCUMENTS

| | | | |
|---|---|---|---|
| 2005/0181776 A1* | 8/2005 | Verma | H04L 69/329 455/418 |
| 2005/0286495 A1* | 12/2005 | Menon | H04W 68/00 370/352 |
| 2008/0058003 A1* | 3/2008 | Rydnell | H04W 68/12 455/552.1 |
| 2008/0076425 A1* | 3/2008 | Khetawat | H04W 88/12 455/436 |
| 2008/0259912 A1* | 10/2008 | Wang | H04W 68/12 370/356 |
| 2011/0070900 A1* | 3/2011 | Shi | H04W 68/00 455/458 |
| 2014/0119285 A1* | 5/2014 | Shaheen | H04L 12/5835 370/328 |
| 2014/0378172 A1* | 12/2014 | Lim | H04W 68/12 455/458 |
| 2016/0205150 A1* | 7/2016 | Shaheen | H04L 12/5835 370/328 |
| 2016/0295549 A1* | 10/2016 | Sebire | H04W 68/02 |
| 2016/0345262 A1* | 11/2016 | Jain | H04W 52/02 |

* cited by examiner

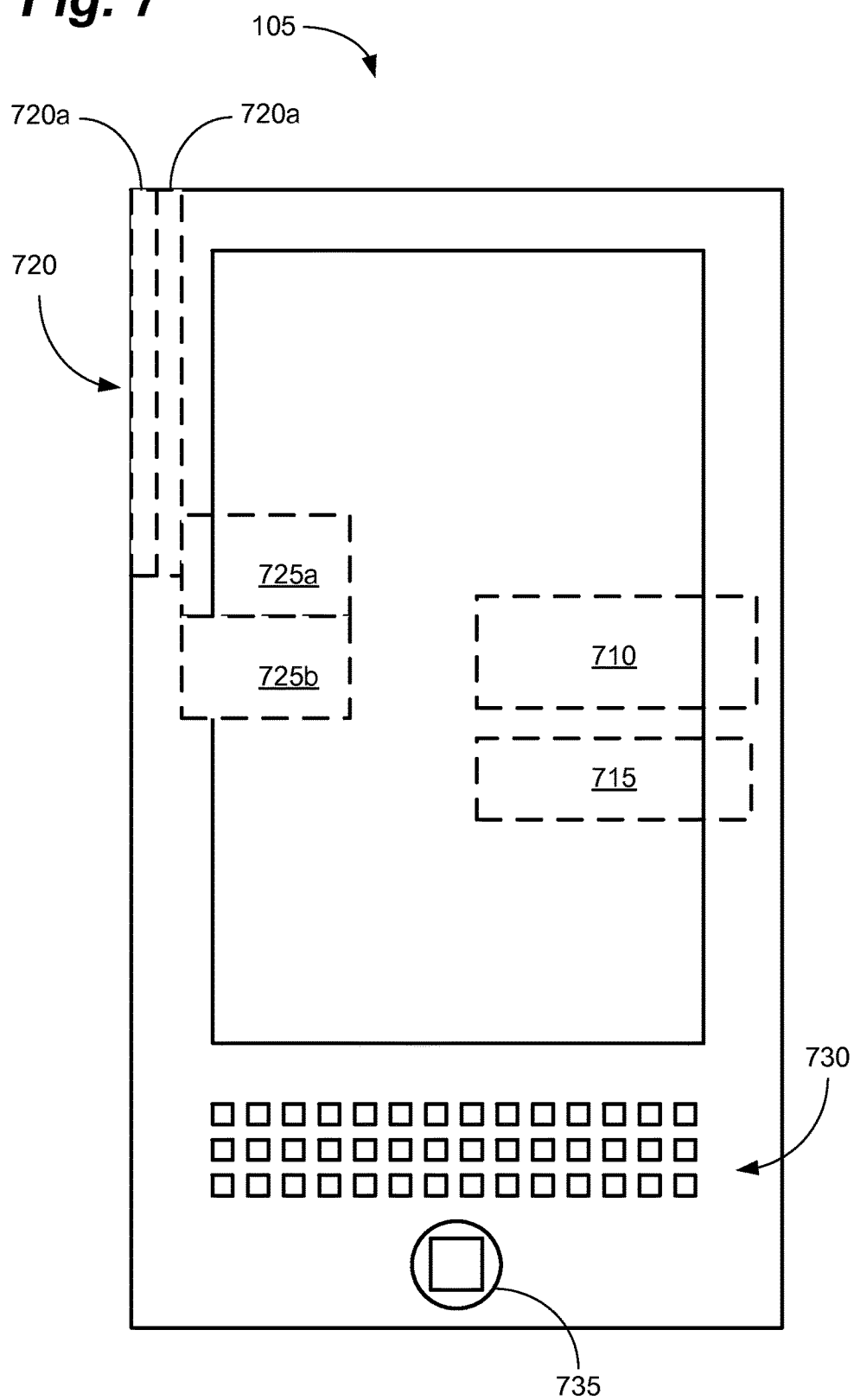

CELLULAR PAGING VIA WLAN

BACKGROUND

A majority of cellular phones and devices available today have both voice call and data capabilities. Smart phones can be used to browse the internet, retrieve e-mail, and download streaming content, among other things. In order to receive voice calls or text messages on conventional cellular systems, however, cell phones must be connected to the cellular network. In this manner, a page can be sent through the system to a user's cell phone alerting the user of an incoming call or text message, for example. If the user does not answer, the call may be rerouted to voicemail, for example, or the text message held in queue until the user reconnects.

In some cases, the user may not receive a page because the user's phone is off, their battery is dead, or they are out of network range. In other cases, the user may turn off cellular service because they are connected to an inter-working wireless local area network (I-WLAN), for example. Even with advanced cellular technologies (e.g., 4G LTE), data can often be more efficiently transmitted over I-WLAN and other systems. In addition, disabling cellular service can also increase battery life because transmitting over shorter distances to an I-WLAN requires less power, among other things. With current technology, however, certain features, such as receiving cellular calls and sending and receiving some types of instant messaging (e.g., short messaging service (SMS) or multimedia messaging service (MMS) messages), for example, may not available, or may only be available at extra cost, when cellular services are disabled.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 is a diagram of a UE, in accordance with some examples of the present disclosure.

DETAILED DESCRIPTION

Examples of the present disclosure can comprise systems and methods for leveraging the standardization provided by 3GPP networks to provide cellular paging via one or more 3GPP network components. The systems and methods presented herein can enable users to disable cellular services on their cellular user equipment, or "UE" (e.g., cell phone, smart phone, or tablet), to conserve battery life and decrease cellular data usage, among other things, when connected to an interworking wireless local area network (I-WLAN). When a user receives any type of data that requires the cellular network (hereinafter, "cellular data") including, but not limited to, a cellular call or an SMS message, the UE can be sent a page over the I-WLAN to reconnect to the cellular network. The user (or the UE automatically) can then reestablish a cellular connection for the UE to receive the cellular communication.

To simplify and clarify explanation, the disclosure is described herein as a system and method for sending a cellular page to a UE using various network components. One skilled in the art will recognize, however, that the disclosure is not so limited. The system is described as a system for paging UEs, but can include any device that is capable of both a cellular and I-WLAN connection. In addition, while various cellular network components are disclosed generally, other components could be used, or components could be connected in different configurations than those shown.

The equipment, methods, and systems described hereinafter as making up the various elements of the present disclosure are intended to be illustrative and not restrictive. Many suitable UEs, networks, and other cellular and I-WLAN equipment, that would perform the same or a similar function as the systems described herein, are intended to be embraced within the scope of the disclosure. Such other systems and methods not described herein can include, but are not limited to, UEs, control systems, cellular and wireless networks, and technologies that are developed after the time of the development of the disclosure.

Figure 1A:
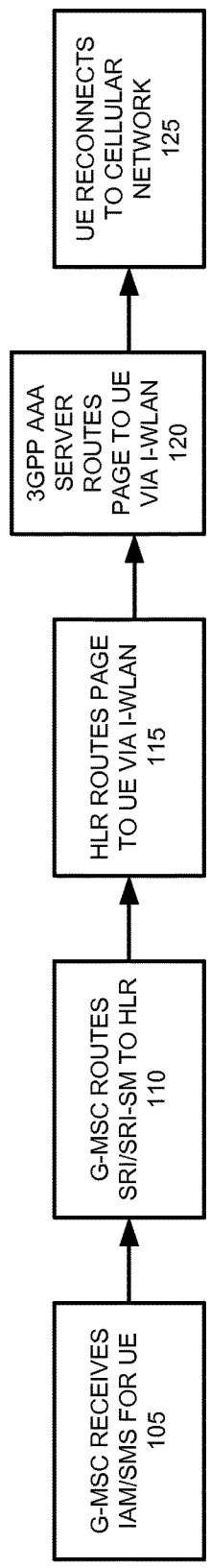
FIG. 1A is a linear diagram depicting a method for routing a page to a cellular user equipment (UE) via a home location register (HLR), in accordance with some examples of the present disclosure.
Figure 1B:
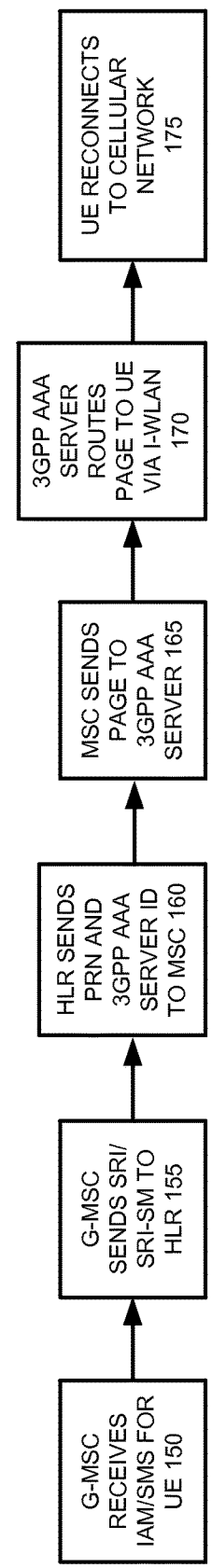
FIG. 1B is a linear diagram depicting a method for routing a page to user equipment (UE) via a mobile switching center, in accordance with some examples of the present disclosure.

As shown in simplified form in FIGS. 1A and 1B, embodiments of the present disclosure can comprise systems and methods for paging a UE using an I-WLAN connection. As mentioned above, this can enable the UE to increase battery life and decrease cellular data usage, among other things. As used herein, a UE can comprise a plurality of electronic equipment that is capable of connecting to both a cellular and I-WLAN connection such as, for example and not limitation, cell phones, smart phones, smart watches, tablets, laptop computers, and PCs.

FIGS. 1A and 1B relate to a UE that is disconnected from a cellular network, but is connected to an I-WLAN network, including a Third Generation Partnership Project authentication, authorization, and accounting (3GPP AAA) server. In this context, cellular data relates to any data that can (1) only be transmitted over a cellular network (e.g., a cellular call)

or (2) any data that the user or service provider chooses to use a cellular connection to transmit. In some cases, it may be possible but more expensive, for example, to send data via an I-WLAN network. This may be because additional equipment is required, for example, or because the provider of the I-WLAN network restricts, or charges for, access. Regardless, for a variety of reasons, the cellular provider may choose to send one or more types of data via a cellular connection.

To this end, when a UE received cellular data, a page can be sent to the UE via the I-WLAN network to tell the UE to reconnect to the cellular network. In some examples, as shown in FIG. 1A, a gateway mobile switching center (G-MSC) can receive an initial address message (IAM) or short messaging system (SMS) (collectively, a "cellular page") addressed to the UE, as shown at 105. In some examples, the G-MSC can then send routing information (SRI) or SRI short message (SRI-SM) to a home location register (HLR), as shown at 110.

Due to 3GPP standardization, however, the HLR and the 3GPP AAA server are connected to the same I-WLAN network. As a result, the HLR can "see" that the UE is connected to the 3GPP AAA server. Thus, the HLR can route a page to the 3GPP AAA server, as shown at 115, which can then route the page to the UE, as shown at 120. The page, which can comprise a new extensible authentication protocol (EAP) attribute, can instruct the phone to reconnect to the cellular network, as shown at 125. In some examples, the EAP attribute can comprise "AT_PAGING_REQ," or similar, to inform the UE of an awaiting call or SMS.

In other examples, as shown in FIG. 1B, again the G-MSC can receive a cellular page for the UE, as shown at 150, and can send SRI or SRI-SM data to the HLR, as shown at 155. As before, the HLR can "see" that the UE is connected to the 3GPP AAA server via the I-WLAN connection. As a result, the HLR can send provide roaming number (PRN) request to a previously selected MSC and can also include the ID, address, or location, for example, of the 3GPP AAA server, as shown at 160. With this information, the MSC can now send the paging request (e.g., "AT_PAGING_REQ") to the 3GPP AAA server, as shown at 165. The 3GPP AAA server can then route the page to the UE via the I-WLAN, as shown at 170, prompting the UE to reconnect to the cellular network, as shown at 175.

Regardless of the method—i.e., that shown in FIG. 1A or FIG. 1B—once the UE is reconnected to the cellular network, call and/or data routing is handled in the normal manner, as discussed in more detail below. In some examples, after the UE has received the cellular data, the UE can disconnect from the cellular network again. If the cellular network receives additional cellular data for the UE, another page can be routed to the UE via the I-WLAN to reconnect.

Figure 2:
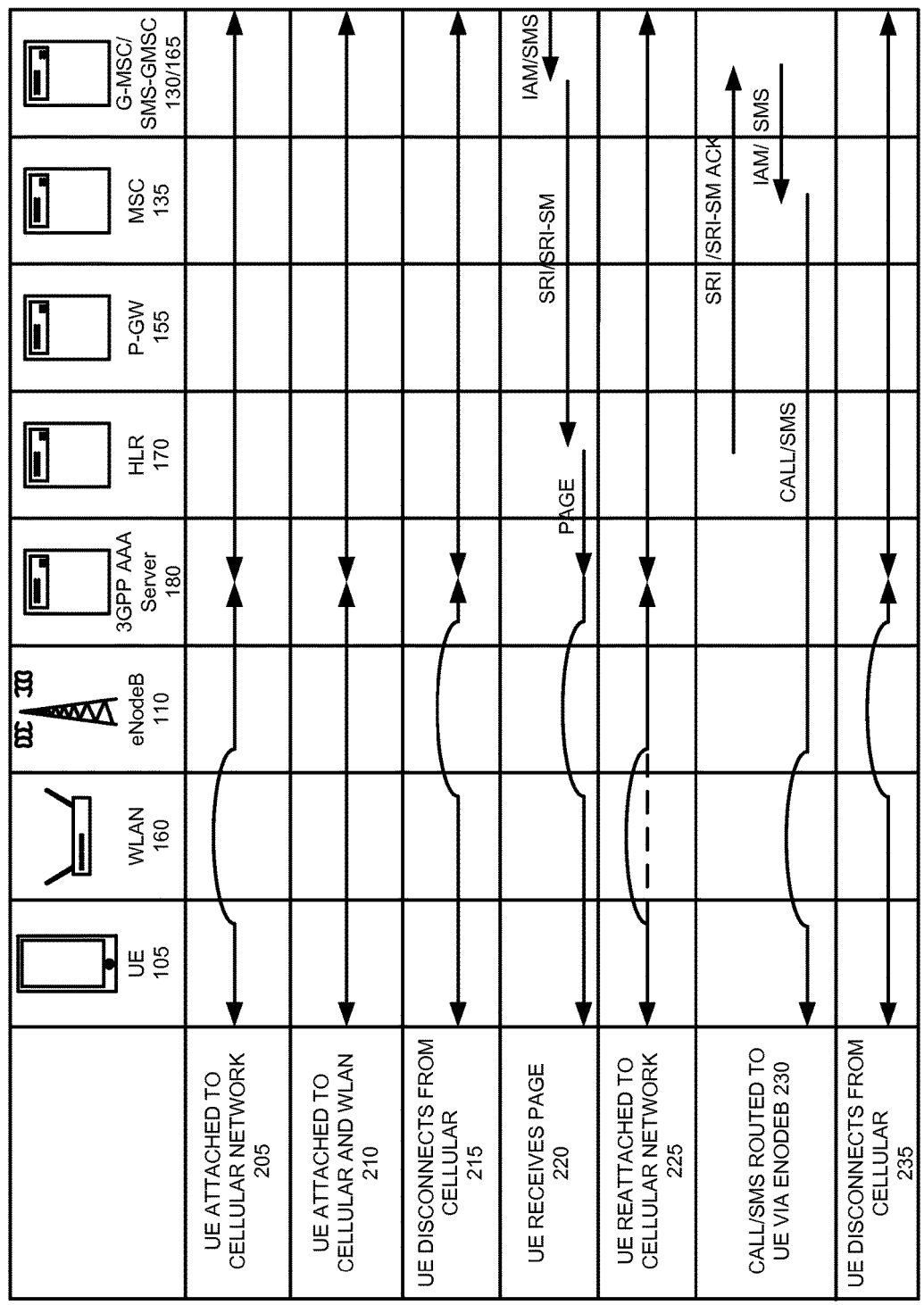
FIG. 2 is a signal routing diagram for sending a cellular page to a UE that is disconnected from a cellular network via the HLR and then routing a cellular communication to the UE once reconnected, in accordance with some examples of the present disclosure.

As shown graphically in FIG. 2, examples of the present disclosure can comprise a method 200 for routing cellular data (e.g., a cellular call or SMS) through an HLR 170. Moving from top to bottom, FIG. 2 depicts the various signals and routing involved in connecting cellular data to a UE 105 that is disconnected from the cellular network (e.g., the cell tower 110). As shown, the UE 105 can initially be connected to a 3GPP access network to access cellular services via the cellular network (e.g., via a cell tower, or eNodeB 110). If the UE 105 enters an area with I-WLAN 160 access, however, the UE 105 can connect to the I-WLAN 160 to gain access to the 3GPP access network. At this point, an application on the UE 105 (or the user manually) can determine that it is connected to both the cell tower 110 and the I-WLAN 160 and thus, can disconnect the cell tower 110. As mentioned above, this can increase battery life and decrease cellular data usage, among other things.

The UE 105 is now connected via the I-WLAN 160 only and would normally not be able to receive certain types of cellular data (e.g., cellular calls or SMS messages). Because the UE 105 and the HLR 170 are both connected to the 3GPP AAA server 180, however, the HLR 170 can "see" the UE 105 on the I-WLAN 160. As a result, the HLR 170 can send paging information to the UE 105 via the 3GPP AAA server 180.

When the G-MSC 130 (or SMS-GMSC 165) receives a cellular page for the UE 105, for example, the G-MSC 130 can send an SRI (or SRI-SM) to the HLR 170. Because the HLR 170 and the UE 105 are both connected to the 3GPP AAA server 180, however, the HLR 170 can send a page to the 3GPP AAA server 180. The 3GPP AAA server, in turn, can send the page to the UE 105 via the I-WLAN 160 network. This can be done, for example, using a new extensible authentication protocol (EAP) attribute such as, for example and not limitation, "AT_PAGING_REQ".

This page can instruct the UE 105 to reconnect to the cell tower 110 and receive the call or SMS, as applicable. In some examples, the UE 105 can automatically reconnect to the cell tower 110. In other examples, the UE 105 can provide, for example, a text message, tone, or other alert to the user to prompt the user to manually reconnect to the cell tower 110. Once reconnected, the cellular data can be routed to the UE 105 using the normal channels. In other words, the HLR 170 can send an SRI or SRI-SM acknowledgment (SRI ACK or SRI-SM ACK) to the G-MSC 130 or SMS-GMSC 165, respectively. The G-MSC 130 or SMS-GMSC 165 can then send the cellular page (IAM or SMS), as applicable, to the MSC 135. The MSC 135 can then route the call or SMS to the UE 105 via the cell tower 110.

To maximize battery life, in some examples, once the UE has received the cellular data, the UE 105 can again disconnect from the cell tower 110. In other situations, the UE 105 can stay connected for a predetermined amount of time (e.g., 5 minutes) to ensure an SMS exchange is complete, for example, or to wait for possible callbacks. In still other embodiments, an application on the UE 105 may automatically disconnect after a predetermined amount of time, or may prompt the user to disconnect after a predetermined amount of time.

Figure 3A:
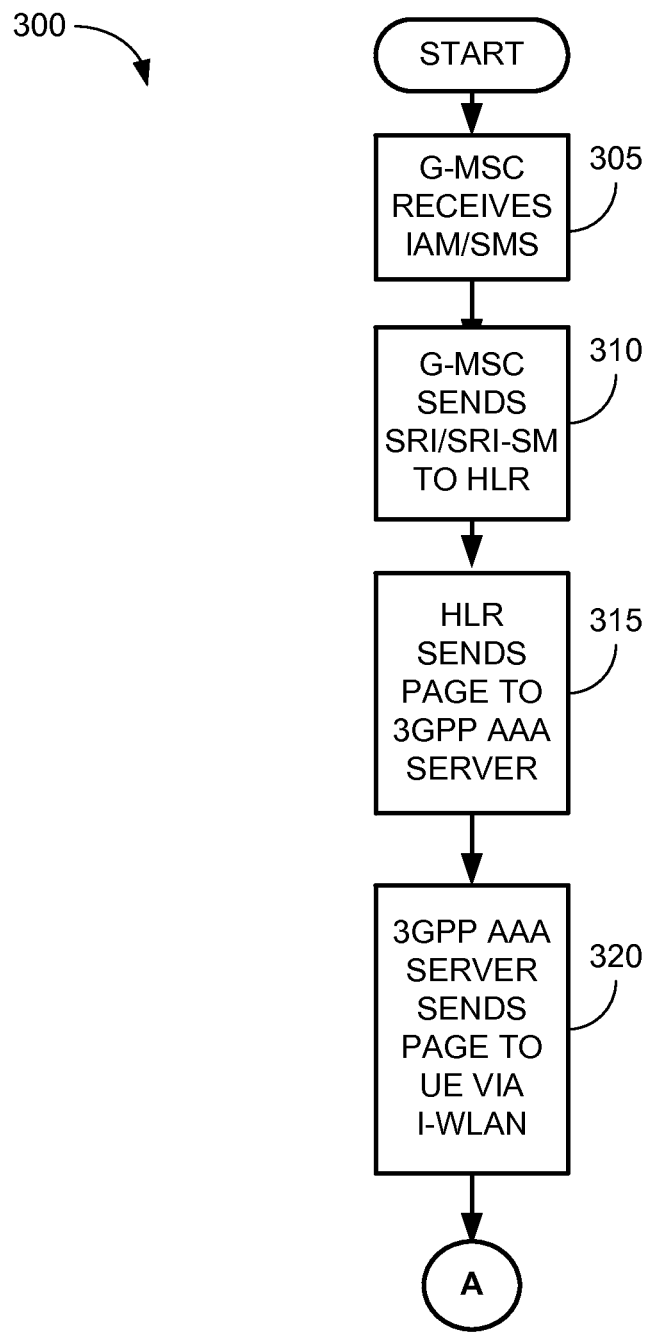
FIGS. 3A-3B collectively illustrate a flowchart depicting a method for sending a cellular page to a UE that is disconnected from a cellular network via the HLR and then routing a cellular communication to the UE once reconnected, in accordance with some examples of the present disclosure.
Figure 3B:
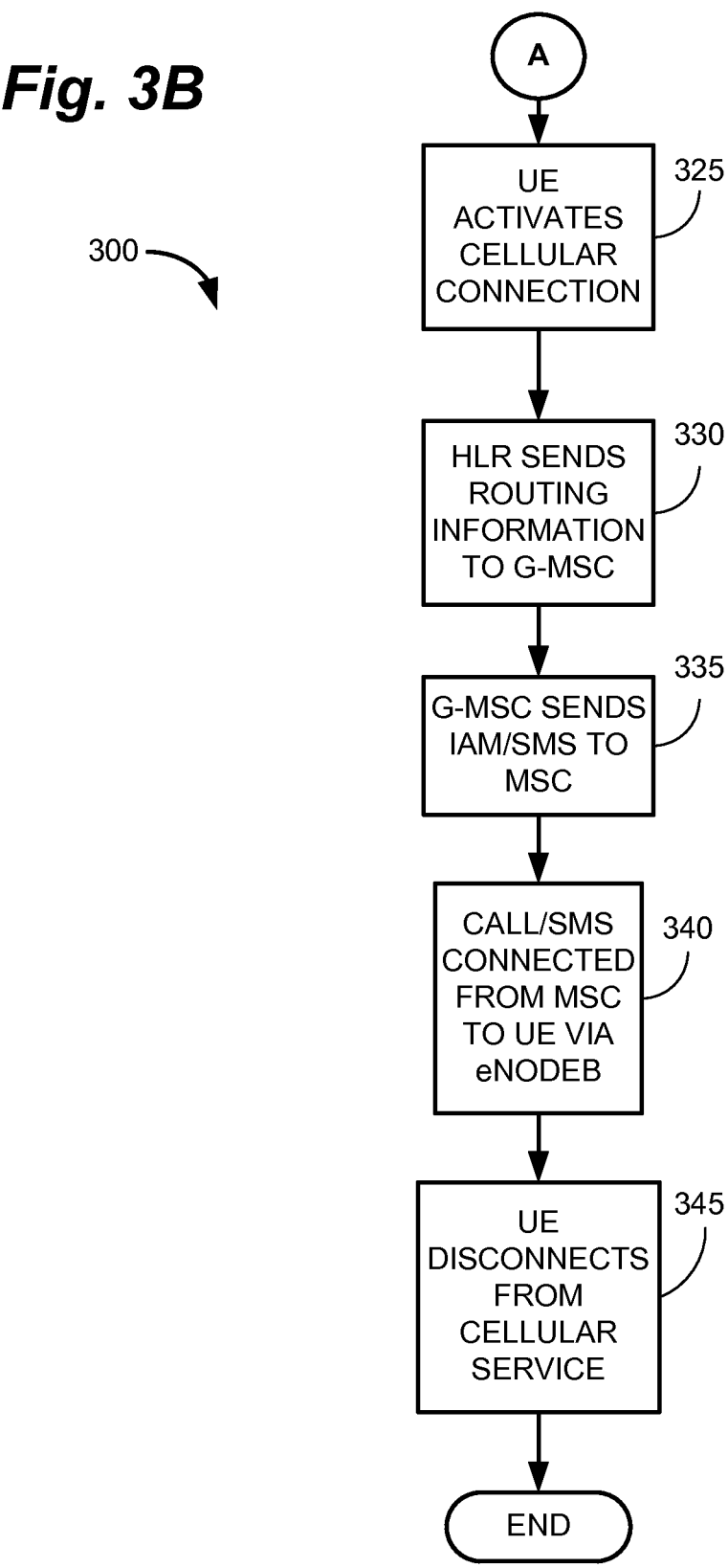

Similarly, FIGS. 3A-3B are flowcharts depicting a method 300 for routing cellular data (e.g., cellular calls and/or SMS) through the HLR. As shown in FIG. 3A, the method 300 can begin with the G-MSC 130 receiving cellular page for the UE, as shown at 305. The G-MSC can then send an SRI or SRI-SM to the HLR 170, as shown at 310. As discussed above, because the HLR and the UE are both attached to the 3GPP AAA server, the HLR can see that the UE is connected to the I-WLAN network. The HLR 170 can then send a page for the UE to the 3GPP AAA server, as shown at 315. Finally, the 3GPP AAA server can send the page to the UE, as shown at 320. The page can instruct the UE to reconnect to the cellular network to receive cellular data.

The UE can then activate the cellular connection, as shown at 325. In some examples, an application on the UE can automatically reconnect to the cellular network. In other examples, the UE can prompt the user to reconnect manually, or can provide some notification a pending cellular data.

Once reconnected, the cellular data can be routed to the UE in the normal manner. In other words, now that the UE is connected to the cellular network, the HLR knows what MSC the UE is connected to. As a result, the HLR can send routing information to the G-MSC, as shown at 330. This can enable the G-MSC to send the cellular page to the MSC, as shown at 335. The MSC can then connect the call, SMS, or other cellular data to the UE via the cellular network, as shown at 340. In some examples, the UE can then automatically or manually disconnect from the cellular network, as shown at 345.

Figure 4:
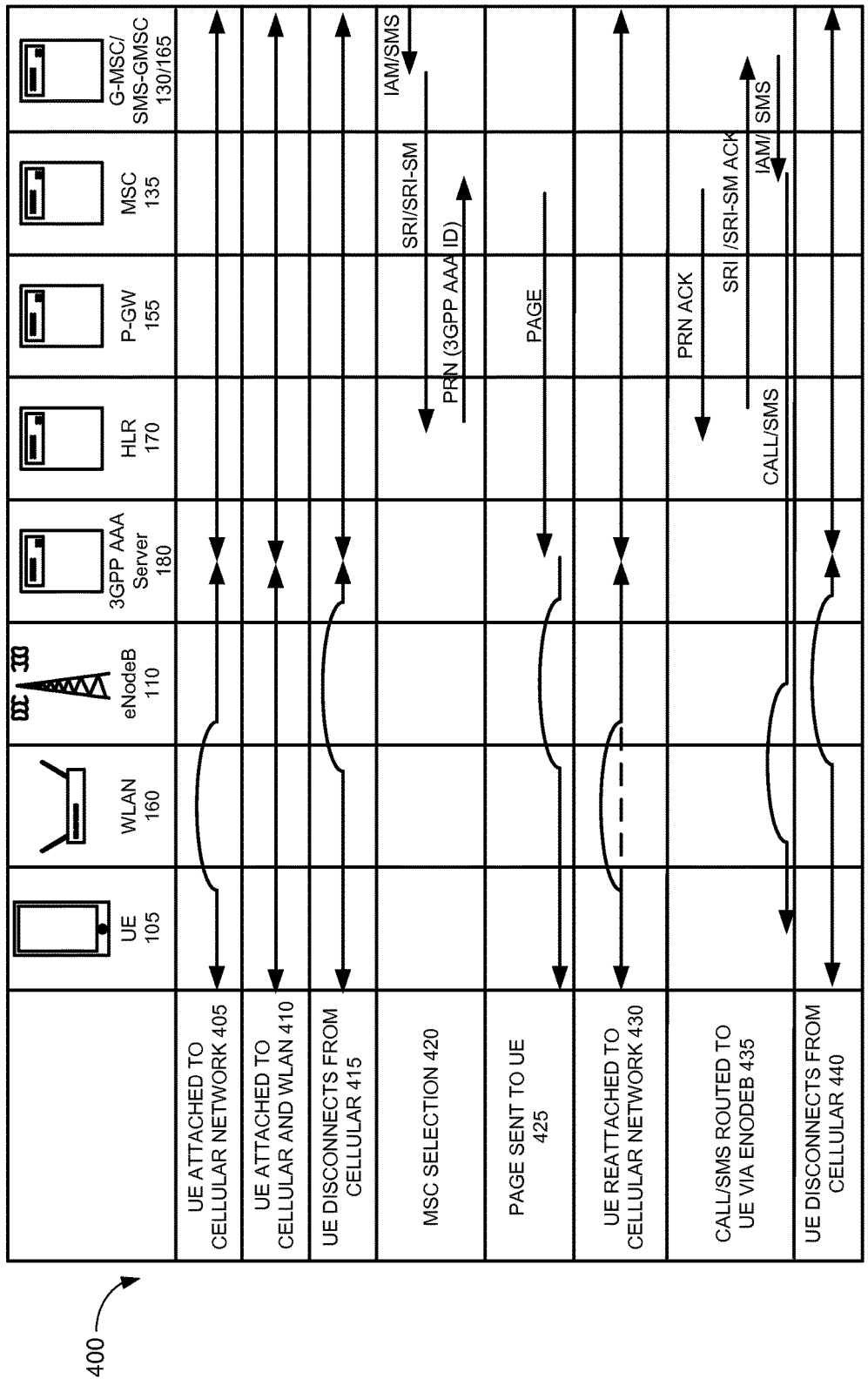
FIG. 4 depicts a signal flow chart for sending a cellular page to UE that is disconnected from a cellular network via a mobile switching center (MSC) and then routing a cellular communication to the UE once reconnected, in accordance with some examples of the present disclosure.

Examples of the present disclosure can also comprise a system 400 for routing cellular data through an MSC. FIG. 4 is a signal routing diagram for a system 400 for routing a cellular call, SMS page, or other cellular data through an MSC 135. Moving from top to bottom in FIG. 4, the UE 105 can initially be connected via the 3GPP access network to cellular services via the cell tower 110. If the UE 105 enters an area with I-WLAN 160 access, however, the UE 105 can connect to the I-WLAN 160 to gain access to the 3GPP access network. At this point, the UE 105 can determine that it is connected to both the cell tower 110 and the I-WLAN 160 and thus, can disconnect the cell tower 110 (though it may stay connected to both in certain circumstances).

The UE 105 is now connected only via the I-WLAN 160 and, as before, would normally not be able to receive cellular calls or text messages. As discussed above, however, because the UE 105 and the HLR 170 are both connected to the 3GPP AAA server 180, the HLR 170 can "see" the UE 105 on the I-WLAN 160. This enables the HLR 170 to both (1) know the location of the UE and the address, or ID, of the relevant 3GPP AAA Server 180. Thus, an IAM (or SMS) can be received by the G-MSC 130 (or SMS-GMSC) 165 for the UE 105. The G-MSC 130 can then send the IAM to the HLR 170. The HLR 170 can then send a PRN to the MSC 135, including an ID, IP address, or other data related to the 3GPP AAA server 180. The MSC 135 can then send the page instructing the UE 105 to reconnect to the cellular network via the 3GPP AAA server 180 and the I-WLAN 160.

Once reconnected, the cellular data can be routed to the UE. In some examples, the HLR 170 can select an appropriate MSC 135. In some examples, MSC 135 selection can be done based on the most recent MSC 135 the UE 105 was connected to prior to disconnecting from the cellular network 110. In other examples, MSC 135 selection can be done based on the closest MSC 135 to the 3GPP AAA server 180 (if the location for the 3GPP AAA server 180 is known). In still other examples, the MSC 135 selection can be done based on the closest MSC 135 to the UE 105 or the I-WLAN 160 (i.e., the closest MSC 135 to the router 160 for the I-WLAN network). This can be provided by GPS or cellular location services (e.g., providing location based on triangulation from cell towers) from the UE 105, for example, or can be provided by a router or server connected to the I-WLAN 160.

In some examples, the MSC 135 can be chosen based on a predetermined time threshold. In other words, if the UE 105 was connected to an MSC 135 within a predetermined time threshold (e.g., in the last 10 minutes), the HLR 170 can select that MSC 135. The predetermined time can be based on the coverage are of the MSC 135, for example. In other words, if the coverage area of the MSC 135 is 100 miles, it is unlikely that the UE 105 will be out of range of the MSC 135 within 10 minutes (or even 20 minute unless the UE is supersonic). In other instances, the HLR 170 can receive location information from the 3GPP AAA server 180 and select an MSC 135 within a predetermined distance.

In other embodiments, the HLR 170 can select the MSC 135 within a predetermined radius and/or with the lightest traffic. In other words, the MSC 135 that currently the lowest utilization rates, but is still within an acceptable radius (e.g., 10 miles) of the UE 105, can be selected. In this sense, utilization rates can refer to, for example and not limitation, the number of calls being handled per hour, the total throughput (e.g., the total volume of data being uploaded and/or downloaded at a particular time or for a particular period), or the percentage of available bandwidth for a particular MSC 135. Thus, in some examples, routing the cellular data through the MSC 135 with the lowest utilization rate can be used to balance network traffic, for example, or to increase the speed and accuracy with which the cellular data is transmitted.

After selecting an appropriate MSC 135, regardless of the method used, the MSC 135 can send a PRN acknowledgement (PRN ACK) to the HLR 170. The HLR 170 can then send routing information to the G-MSC 130, which can enable the G-MSC 130 to send the cellular page to the MSC 135. The MSC 135 can then connect the call, SMS, or other cellular data to the UE 105 via the cellular network 110. In some examples, the UE 105 can then automatically or manually disconnect from the cellular network.

Figure 5A:
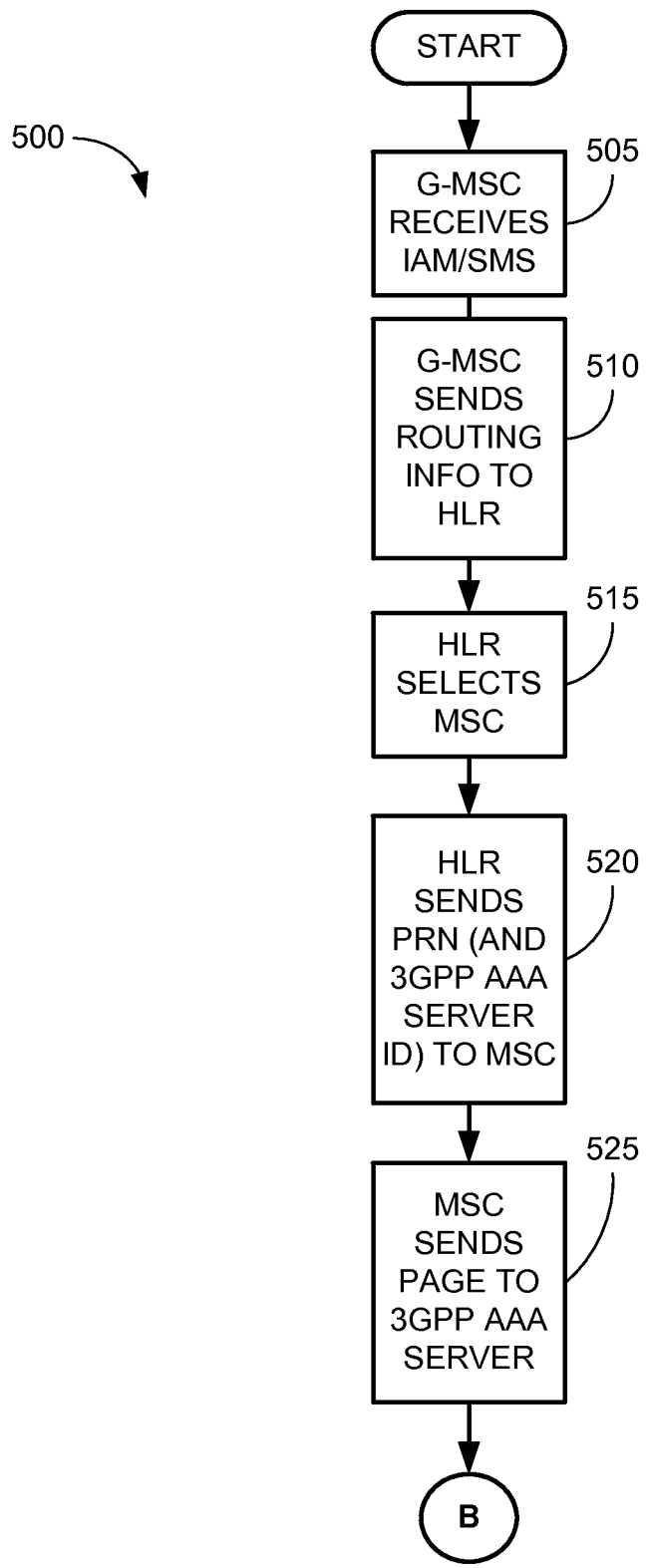
FIGS. 5A-5C are flowcharts depicting a method for sending a cellular page to UE that is disconnected from a cellular network via the MSC and then routing a cellular communication to the UE once reconnected, in accordance with some examples of the present disclosure.
Figure 5B:
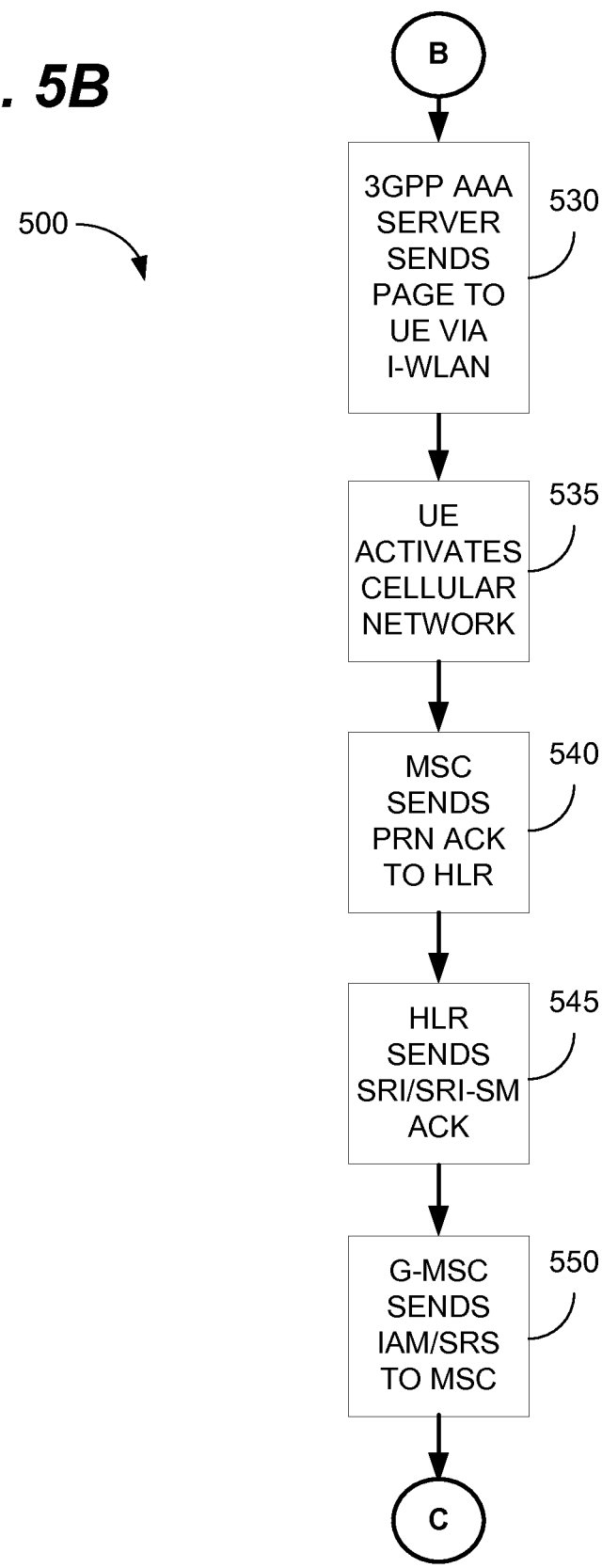
Figure 5C:
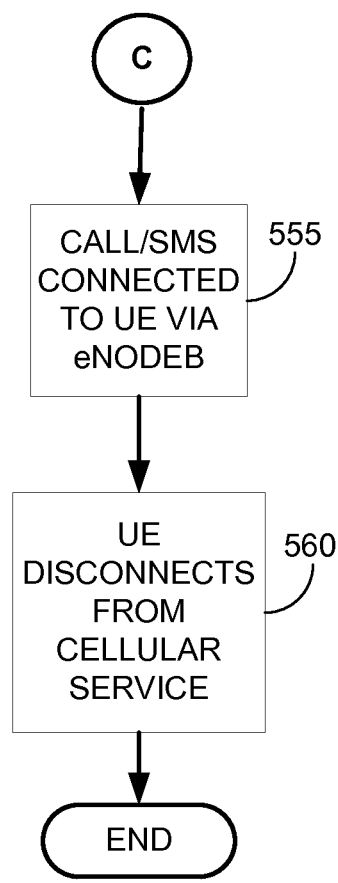

Examples of the present invention can also comprise a similar method 500 for sending a page via the MSC 135 and then routing cellular data to a UE. FIGS. 5A-5C are flowcharts depicting the method 500. As shown in FIG. 5A, the method 500 can begin with the G-MSC receiving a cellular page for the UE, as shown at 505. The G-MSC can then send the SRI (or SRI-SM) to the HLR, as shown at 510. The HLR can then determine if there is an appropriate MSC available, as shown at 515. Various methods for selecting the MSC are discussed above. If the HLR is unable to locate an appropriate MSC (e.g., the UE has not been connected to an MSC within the predetermined timeframe), however, the system can revert to the method 300 described above, and shown in FIGS. 3A-3B, for paging the UE. If an appropriate MSC can be selected, however, the HLR can send the PRN and the 3GPP AAA server ID to the MSC, as shown at 520, and the MSC can send the page to the 3GPP AAA server, as shown at 525.

As shown in FIG. 5B, in response, the 3GPP AAA server can then send the page to the UE via the I-WLAN, as shown at 530. In response to the page, the UE can automatically connect the cellular connection, as shown at 535. Of course, the UE could instead include providing the user with a message to manually connect to the cellular network. This would enable the user to decide whether to accept the call, for example, or let it go to voicemail.

Once the UE is reconnected to the cellular network via the cell tower, the MSC can send the PRN ACK to the HLR, as shown at 540. The HLR can then send the routing information acknowledgement (SRI ACK or SRI-SM ACK) to the G-MSC, as shown at 545. The G-MSC 550 can then send the cellular page to the MSC, as shown at 550, and the MSC can route the cellular data to the UE via the cellular network, as shown at 555. In some examples, as shown at 560, to maximize battery life, the UE 105 can then disconnect cellular services after the cellular data is received (e.g., the SMS is received or the call is concluded). In other situations, the UE can stay connected for a predetermined amount of time (e.g., 5 minutes) to ensure an SMS exchange is complete, for example, or to wait for possible callbacks. In still other examples, the MSC, or other component of the cellular network can send a second page to the UE to inform the UE that all cellular data has been sent and to disconnect from the cellular network.

Figure 6A:
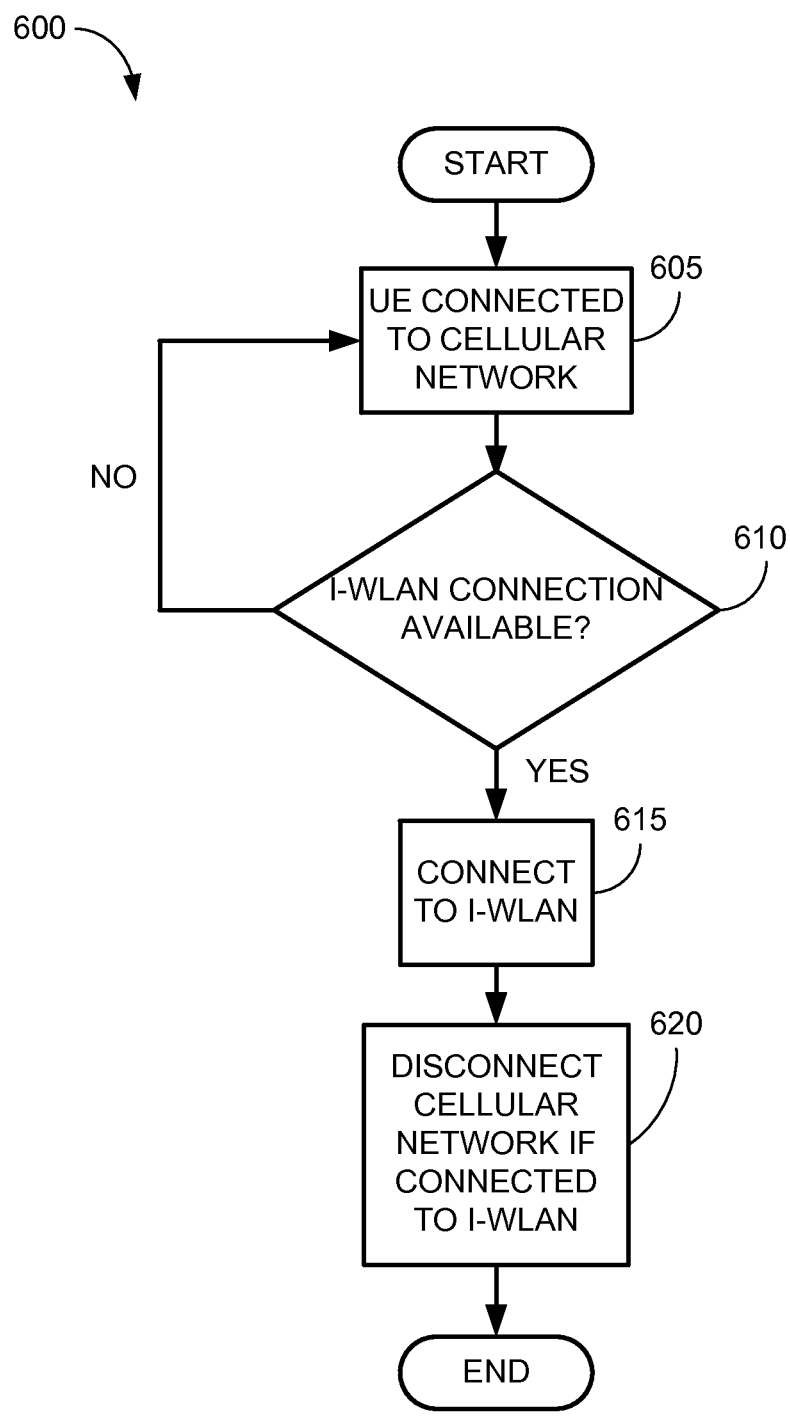
FIGS. 6A-6B are flowcharts depicting a method for switching a UE between a cellular connection and a wireless local area network (I-WLAN), in accordance with some examples of the present disclosure.
Figure 6B:
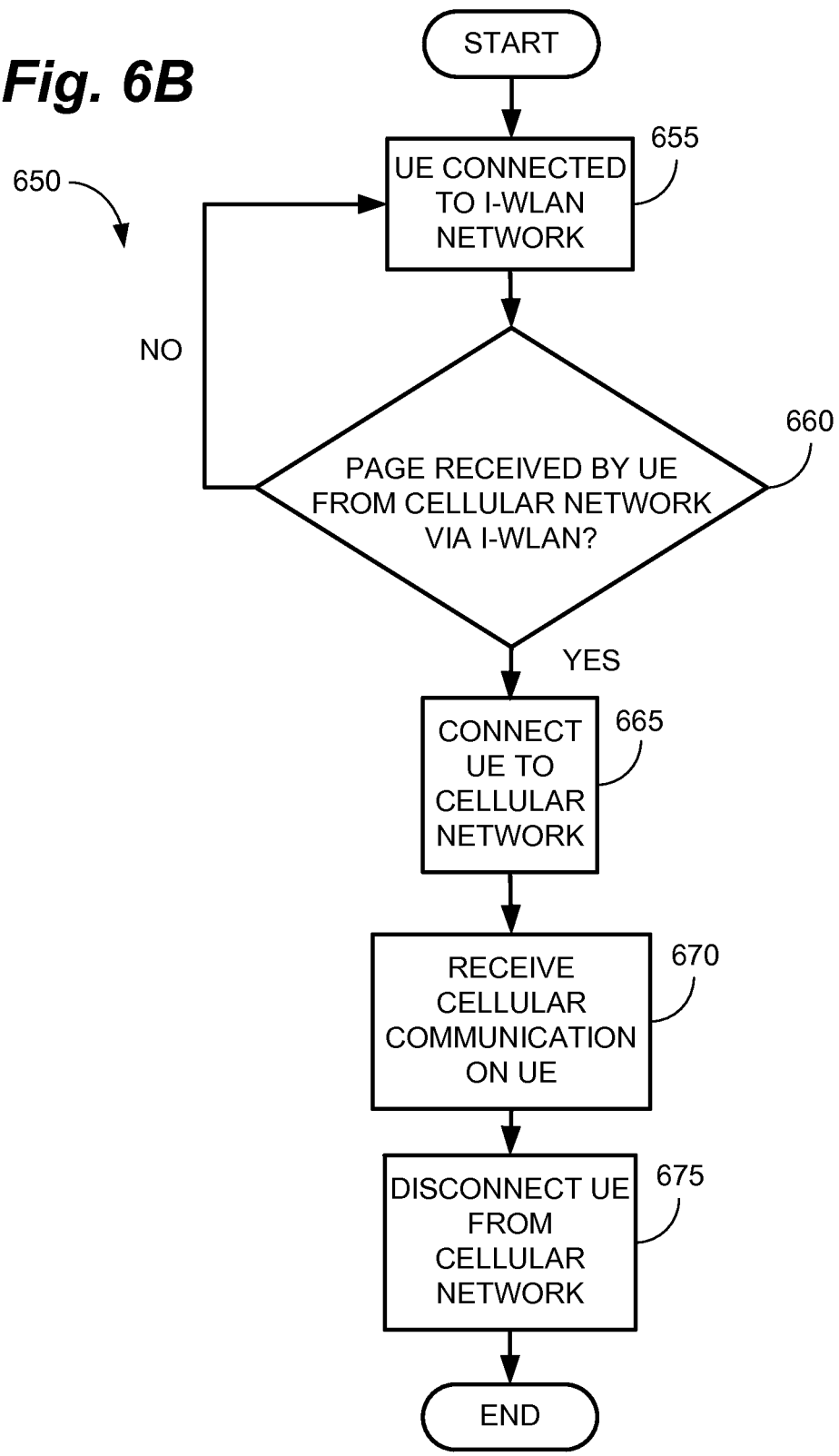

Examples of the present disclosure can also comprise one or more methods, or applications 600, 650, for automatically connecting and disconnecting a UE from the cellular network and I-WLAN 160, as shown in FIGS. 6A and 6B. The applications 600, 650 can be stored in a memory on the UE, for example, and executed by the UE's processor. As shown in FIG. 6A, in some examples, the application 600 can automatically connect to I-WLAN networks and disconnect from cellular networks. In some examples, the UE can be connected to a cellular network, as shown at 605. The application 600 can then detect if there are any I-WLAN networks available for connection, as shown at 610. This can be done, for example, by polling the wireless transceiver in the UE, for example, or by detecting a ping from the I-WLAN.

If the UE detects an available I-WLAN, the UE can connect to the I-WLAN, as shown at 615. Of course, the UE 105 may need a password, or other credentials, to connect to the I-WLAN. In some examples, the application 600 may query the user as to whether they would like to connect to the I-WLAN (e.g., some users may decline to connect to public networks, for example). If an I-WLAN 615 connection is established, however, in some examples, the application 600 can then disconnect, or deactivate, the cellular connection, as shown at 620. As mentioned above, this can improve battery life for the UE, can increase data throughput, and can minimize cellular data costs, among other things.

In other examples, as shown in FIG. 6B, the method, or application 650, can also comprise a method for disconnecting a UE from an I-WLAN in response to a cellular page and reconnecting it to a cellular network to receive cellular data. As discussed above, in some examples, cellular data can comprise, for example, voice calls and text messages that are only available via a cellular connection. In other example, cellular data can comprise data that a service provider or user chooses to receive via a cellular connection. This may be because receiving cellular data over an I-WLAN connection is more expensive, for example, or because access to the I-WLAN network is restricted.

Regardless, as discussed above, the UE can be connected to the I-WLAN, as shown at 655. The application 650 can then receive a cellular page via the I-WLAN using, for example, one of the methods, 300, 500 discussed above, as shown at 660. The page can be routed through a variety of 3GPP components to affect this communication including, but not limited to, the HLR, the MSC, and the 3GPP AAA server.

Upon receiving the page (e.g., from the HLR or MSC via the 3GPP AAA server), the application 650 can reconnect the UE to the cellular network (e.g., the eNodeB 110), as shown at 665. In some instances, the can be done automatically by the application 650. In other instances, the application 650 can prompt the user to reconnect manually. Once connected, the UE can receive the cellular data (e.g., a voice call or text message), as shown at 670.

In some examples, the application 650 can connect the UE to the cell tower only long enough to receive the cellular data. In other examples, the application 650 can wait for a predetermined period of time (e.g., 30 seconds, 2 minutes, 5 minutes, etc.) and then disconnect from the cellular network. In still other examples, the application 650 can prompt the user to manually disconnect/connect. Regardless, once the cellular communication has been received, in some examples, the application 650 can disconnect the UE from the cellular network, as shown at 675.

As mentioned above, the UE 105 can comprise a number of electronic devices capable of connecting to both cellular and wireless networks. The UE 105 can comprise, for example and not limitation, a smart phone, smart watch, tablet, laptop computer, or personal computer. As shown in FIG. 7, the UE 105 can generally comprise a display 705 for conveying information to the user and one or more input devices. In some embodiments, the display 705 can comprise a variety of display types including, but not limited to, thin film transistor (TFT) and other types of liquid crystal displays (LCDs) and light emitting diode (LED) displays, including organic LED (OLED) displays. In some embodiments, the display 705 can also comprise a touchscreen and can provide inputs to the UE 105.

In some examples, the UE 105 can also comprise one or more input devices including, for example, a keyboard 730, the display 705 (if haptic), and a menu button 735. As the name implies, the input devices, 705, 730, 735 can enable the user to enter data, select applications, and surf the internet, among other things.

In some examples, the UE 105 can also comprise a processor 710 for running one or more applications, call and text message handling, and other functions. The processor 710 can comprise one or more computer chips, application specific integrated chips (ASIC), or a field programmable gate arrays (FPGA), among other things.

The processor 710 can also be connected to one or more types of memory 715. The memory 715 can comprise a combination of permanent memory and/or removable memory, as discussed below, for storing applications, addresses, locations, and other data. See, FIG. 8. The UE 105 can also comprise one or more antennas 720 and one or more transceivers 725. In some embodiments, the UE 105 can have a first transceiver 725a and antenna 720a for sending and receiving cellular data and a second transceiver 725b and antenna 720b for sending and receiving data via a WLAN or I-WLAN. In other examples, these features can be combined into a single transceiver 725 and antenna 720.

The systems and methods disclosed herein can comprise software updates, routines, modules, or even separate hardware associated with existing hardware. In some examples, the method 300, 500 can include modules on one or more of the 3GPP AAA server 180, the HLR 170, the G-MSC 130, and the MSC 135. Each of these components can comprise, for example and not limitation, a processor, a server, an ASIC, or an FPGA.

Figure 8:
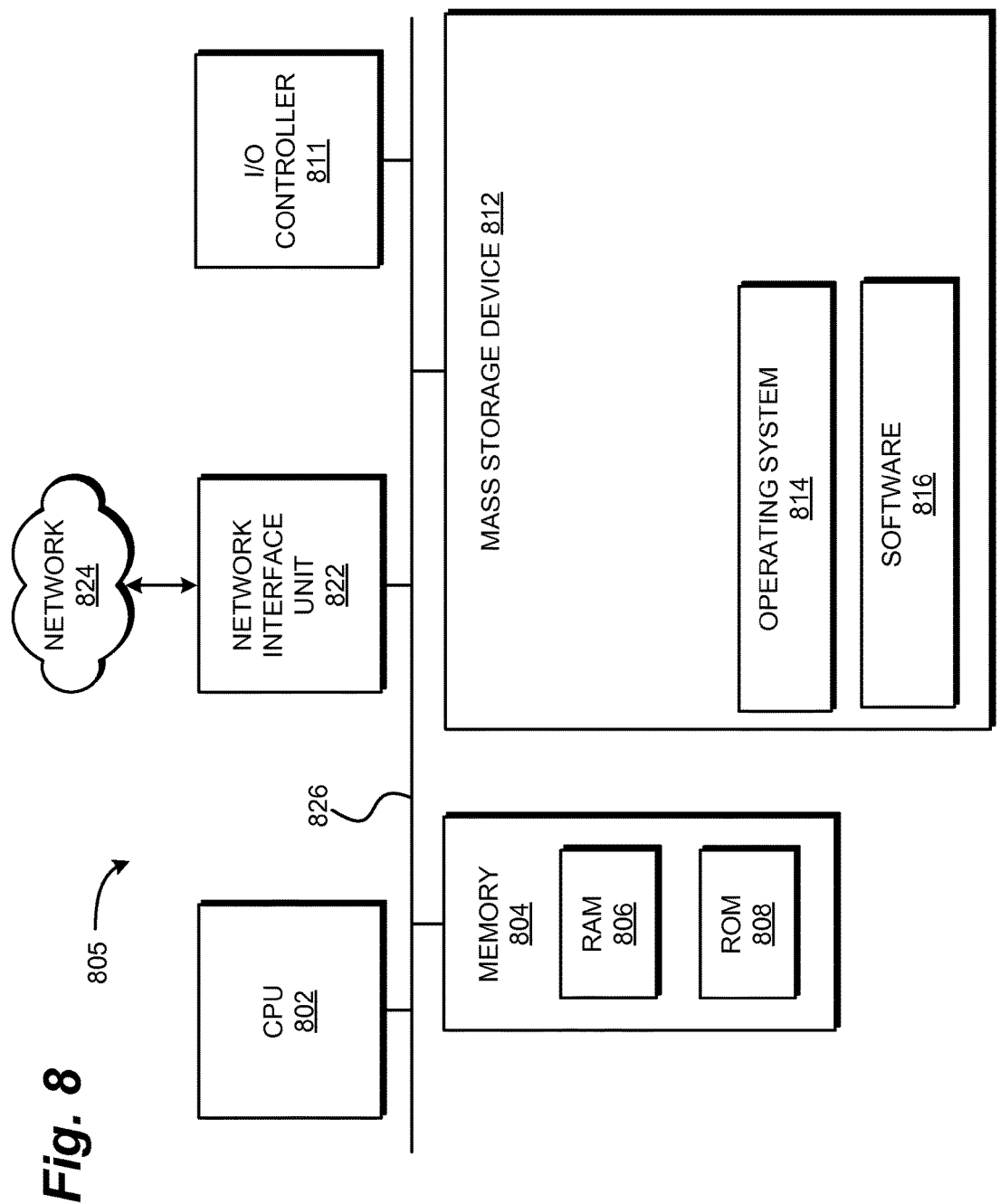
FIG. 8 is a diagram of a computer or server, in accordance with some examples of the present disclosure.

In some examples, one or more of the 3GPP AAA server 180, the HLR 170, the G-MSC 130, and the MSC 135 can comprise a computer or server as shown in FIG. 8. FIG. 8 illustrates an exemplary server, or computer 805. Thus, the computer 805 illustrated in FIG. 8 illustrates an architecture for a mobile device processor, a server computer, a desktop computer, a netbook computer, a tablet, and/or a laptop computer. The computer 805 may be utilized to execute any aspects of the software components presented herein.

The computer 805 illustrated in FIG. 8 can comprise a central processing unit 802 ("CPU"), a system memory 804, including a random access memory 806 ("RAM") and a read-only memory ("ROM") 808, and a system bus 826 that couples the memory 804 to the CPU 802. A basic input/output system containing the basic routines that help to transfer information between elements within the computer 805, such as during startup, is stored in the ROM 808. The computer 805 can further include a mass storage device 812 for storing one or more operating systems 814 and/or software 816 for execution by the computer 805 to perform the methods discussed below. Although not shown in FIG. 8, the mass storage device 812 also can be configured to store data related to one or more of the databases (e.g., for the HLR 170).

In some embodiments, the mass storage device 812 can be connected to the CPU 802 through a mass storage controller connected to the bus 826. The mass storage device 812 and its associated computer-readable media can provide volatile and non-volatile storage for the computer 805. Although the description of computer-readable media contained herein refers to a mass storage device, such as a hard disk or CD-ROM drive, it should be appreciated by those skilled in the art that computer-readable media can be any available computer storage media or communication media that can be accessed by the computer 805.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media can include volatile, non-volatile, removable, and non-removable media implemented in many methods or technologies for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 805. For purposes the claims, any reference to the phrase "computer storage medium" and variations thereof, does not include waves, signals, and/or other transitory and/or intangible communication media, per se.

According to various embodiments, the computer 805 may operate in a networked environment using logical connections to remote computers through a network 824 such as a LAN, WLAN, I-WLAN, intranet, or internet connection. The computer 805 can connect to the network 824 through a network interface unit 822 connected to the bus 826. It should be appreciated that the network interface unit 822, which may be utilized to connect to other types of networks and remote computer systems such as, for example, the mass storage device 812. The computer 805 can also include an input/output controller 811 for receiving and processing input from a number of other devices, including a keyboard, mouse, or electronic stylus. Similarly, the input/output controller 811 can provide output to a display screen, a printer, or other type of output device.

In some embodiments, the software components described herein may, when loaded into the CPU 802 and executed, transform the CPU 802 and the overall computer 805 from a general-purpose computing system into a special-purpose computing system customized to facilitate the functionality presented herein such as, for example and not limitation, cellular call and SMS message routing. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. If the computer-readable media is implemented as semiconductor-based memory, for example, the software disclosed herein may be encoded on the computer-readable media by transforming the physical state of the semiconductor memory. The software may also transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 805 in order to store and execute the software components presented herein. It also should be appreciated that the computer 805 may include other types of computing devices, including hand-held computers, embedded computer systems, cell phones, personal digital assistants, and other types of computing devices known to those skilled in the art. It is also contemplated that the computer 805 may not include all of the components shown in FIG. 8, may include other components that are not explicitly shown in FIG. 8, or may utilize an architecture completely different than that shown in FIG. 8.

While several possible examples are disclosed above, examples of the present disclosure are not so limited. For instance, while several possible routes for routing calls and texts via a 3GPP network components are disclosed, other suitable routes and/or components could be selected without departing from the spirit of the disclosure. The systems and methods disclosed herein could also be used on other non-3GPP systems that have similar architecture. In addition, the location and configuration used for various features of the system such as, for example, the relative location and connections of various components (e.g., the HLR 170 and MSC 135) can differ from network to network. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method for routing a cellular page to cellular user equipment (UE) via an interworking wireless local area network (I-WLAN) comprising:
receiving, at a gateway mobile switching center (G-MSC) in communication with a cellular network, an address message comprising cellular data for the UE;
sending a send routing information (SRI) request from the G-MSC to a home location register (HLR), the HLR being connected to the I-WLAN and the cellular network;
sending the cellular page for the UE from the HLR to a Third Generation Partnership Project authentication, authorization, and accounting (3GPP AAA) server in communication with the I-WLAN;
routing the cellular page from the 3GPP AAA server to the UE via the I-WLAN;
sending an SRI acknowledgement (SRI ACK) from the HLR to the G-MSC;
routing the cellular data from the G-MSC to a mobile switching center (MSC);
routing the cellular data from the MSC to the UE via the cellular network; and
disconnecting the UE from the cellular network;
wherein the UE is disconnected from the cellular network and connected to the I-WLAN; and
wherein the cellular page instructs the UE to reconnect to the cellular network to receive the cellular data.

2. The method of claim 1, wherein disconnecting the UE from the cellular network comprises disconnecting the UE from the cellular network automatically after the UE has received the cellular data.

3. The method of claim 1, wherein receiving an address message related to cellular data for the UE comprises an initial address message (IAM) and the cellular data comprises a cellular voice call.

4. The method of claim 1, wherein receiving, at a gateway mobile switching center (G-MSC), an address message related to cellular data for the UE comprises receiving a short messaging service (SMS) message for the UE at a SMS gateway mobile switching center (SMS-GMSC).

5. The method of claim 1, wherein the cellular page instructs the UE to reconnect to the cellular network to receive the cellular data and the UE prompts a user to reconnect to the cellular network manually.

6. A method for routing a cellular page to cellular user equipment (UE) via an interworking wireless local area network (I-WLAN) comprising:
receiving, at a gateway mobile switching center (G-MSC), an address message comprising cellular data for the UE;
sending a send routing information (SRI) request from the G-MSC to a home location register (HLR) connected to the I-WLAN and a cellular network;
selecting a mobile switching center (MSC) using the HLR;
sending a provide roaming number (PRN) request from the HLR to the selected MSC;
sending the cellular page for the UE from the MSC to a Third Generation Partnership Project authentication, authorization, and accounting (3GPP AAA) server in communication with the I-WLAN; and
routing the cellular page from the to the 3GPP AAA server to the UE via the I-WLAN;
wherein the UE is disconnected from the cellular network and connected to the I-WLAN; and
wherein the cellular page instructs the UE to reconnect to the cellular network to receive the cellular data.

7. The method of claim 6, further comprising:
sending a PRN Acknowledgement (PRN ACK) to the HLR;
sending an SRI acknowledgement (SRI ACK) from the HLR to the G-MSC;
routing the cellular data for the UE from the G-MSC to the MSC; and
routing the cellular data from the MSC to the UE via the cellular network.

8. The method of claim 6, wherein selecting the MSC with the HLR comprises selecting the MSC closest to the UE's location.

9. The method of claim 8, wherein the UE's location is provided by one or more of a global positioning system (GPS) receiver in the UE or cellular positioning.

10. The method of claim 8, wherein the UE's location is provided by the I-WLAN.

11. The method of claim 6, wherein selecting the MSC with the HLR further comprises:
selecting a plurality of MSCs within a predetermined radius of the UE; and
selecting a first MSC of the plurality of MSCs, the first MSC having a lowest utilization rate.

12. The method of claim 6, wherein a utilization rate for the MSCs comprises one or more of a total number of calls being handled per hour, a total throughput, or a percentage of available bandwidth for each MSC.

13. The method of claim 6, wherein selecting the MSC with the HLR comprises selecting the MSC closest to the I-WLAN router.

14. The method of claim 6, wherein selecting the MSC with the HLR comprises selecting a last MSC the UE was connected to prior to disconnecting from the cellular network.

15. The method of claim 6, wherein selecting the MSC with the HLR comprises:
selecting a last MSC the UE was connected to within a predetermined time period of disconnecting from the cellular network.

16. A method for routing a cellular page to cellular user equipment (UE) via an interworking wireless local area network (I-WLAN) comprising:
receiving, at a gateway mobile switching center (G-MSC) in communication with a cellular network, an address message comprising cellular data for the UE;
sending a send routing information (SRI) request from the G-MSC to a home location register (HLR) connected to the I-WLAN and the cellular network;
sending a first cellular page for the UE from the HLR to a Third Generation Partnership Project authentication, authorization, and accounting (3GPP AAA) server in communication with the I-WLAN; and
routing the first cellular page from the to the 3GPP AAA server to the UE via the I-WLAN;
wherein the UE is disconnected from the cellular network and connected to the I-WLAN; and wherein the cellular page instructs the UE to reconnect to the cellular network to receive the cellular data.

17. The method of claim 16, further comprising:
sending an SRI acknowledgement (SRI ACK) from the HLR to the G-MSC;
routing the cellular data from the G-MSC to a mobile switching center (MSC); and
routing the cellular data from the MSC to the UE via the cellular network.

18. The method of claim 17, wherein routing the cellular data from the MSC to the UE via the cellular network comprises routing a cellular voice call to the UE.

19. The method of claim 17, wherein routing the cellular data from the MSC to the UE via the cellular network comprises routing a short messaging service (SMS) message to the UE.

20. The method of claim 17, further comprising:
sending a second cellular page to the UE from the MSC via the cellular network;
wherein the second cellular page instructs the UE to disconnect from the cellular network.

* * * * *